(12) United States Patent
Funk et al.

(10) Patent No.: US 9,469,020 B2
(45) Date of Patent: Oct. 18, 2016

(54) HAND-HELD MACHINE TOOL

(71) Applicant: Hilti Aktiengesellschaft, Schaan (LI)

(72) Inventors: Alexander Funk, Schwabmuenchen (DE); Louis Widmer, Ulisbach (CH)

(73) Assignee: Hilti Aktiengesellschaft, Schaan (LI)

( * ) Notice: Subject to any disclaimer, the term of this patent is extended or adjusted under 35 U.S.C. 154(b) by 41 days.

(21) Appl. No.: 14/427,545

(22) PCT Filed: Sep. 10, 2013

(86) PCT No.: PCT/EP2013/068704
§ 371 (c)(1),
(2) Date: Mar. 11, 2015

(87) PCT Pub. No.: WO2014/040980
PCT Pub. Date: Mar. 20, 2014

(65) Prior Publication Data
US 2015/0217434 A1  Aug. 6, 2015

(30) Foreign Application Priority Data

Sep. 12, 2012 (DE) .......... 10 2012 216 137

(51) Int. Cl.
*B23B 31/107* (2006.01)
*B25B 23/00* (2006.01)
*B25D 17/08* (2006.01)

(52) U.S. Cl.
CPC ....... *B25B 23/0035* (2013.01); *B23B 31/1071* (2013.01); *B25D 17/088* (2013.01);
(Continued)

(58) Field of Classification Search
CPC ............ B23B 31/1071; B23B 31/107; B23B 2260/136; B25B 23/0035; Y10T 279/17145; Y10T 279/17752; Y10T 279/17196; Y10T 279/17743; Y10T 279/17188; Y10S 279/905
See application file for complete search history.

(56) References Cited

U.S. PATENT DOCUMENTS 1,814,274 A  7/1931 Williamson
3,552,147 A  1/1971 Johansson et al.
(Continued)

FOREIGN PATENT DOCUMENTS

DE  1 810 223  7/1969
DE  33 24 756 A1  1/1985
(Continued)

OTHER PUBLICATIONS

PCT/EP2013/068704 International Search Report (PCT/ISA/210), dated Sep. 12, 2013, (two (2) pages.
(Continued)

*Primary Examiner* — Eric A Gates
*Assistant Examiner* — Chwen-Wei Su
(74) *Attorney, Agent, or Firm* — Crowell & Moring LLP

(57) ABSTRACT

A hand-held machine tool is disclosed. The tool has an electric motor and an output shaft which can be driven by the electric motor about a working axis. The output shaft has an intake space which is open on the output side for receiving a machine tool and which has two elongated holes cutting into the intake space in the radial direction. Blocking elements lie in the elongated holes and protrude into the intake space and are movable between an end on the output side of the elongated hole and an end on the drive side of the elongated hole. The blocking elements abut on a radial stop in the radial direction and are forced into the intake space in an engaging manner. The stop overlaps in a locked position with the ends on the output side of the elongated holes and can be moved in the withdrawal direction against a spring force of a spring for releasing a radial movement of the blocking elements from the engagement with the intake space. A second spring includes a support ring, two bows protruding from the support ring in the withdrawal direction and bent around the intake space in the form of a segment of a circle, and a pin engaging radially from each bow in the withdrawal direction in front of the blocking element into the elongated hole.

7 Claims, 2 Drawing Sheets

(52) U.S. Cl.
CPC .. *B23B2231/0252* (2013.01); *B23B 2260/136* (2013.01); *B25D 2217/0042* (2013.01); *B25D 2250/301* (2013.01); *B25D 2250/371* (2013.01); *Y10S 279/905* (2013.01); *Y10T 279/17145* (2015.01); *Y10T 279/17196* (2015.01); *Y10T 279/17752* (2015.01); *Y10T 279/17811* (2015.01)

(56) References Cited

U.S. PATENT DOCUMENTS

| | | | |
|---|---|---|---|
| 5,398,946 A | 3/1995 | Quiring | |
| 5,601,388 A * | 2/1997 | Lauterwald | B25D 17/088 408/239 A |
| 6,079,716 A * | 6/2000 | Harman, Jr. | B23Q 3/12 279/143 |
| 7,306,396 B1 * | 12/2007 | Chen | B25B 13/5008 279/74 |
| 8,381,830 B2 * | 2/2013 | Puzio | B23B 31/1074 173/132 |
| 2002/0109306 A1 * | 8/2002 | Huggins | B23B 31/1238 279/24 |
| 2003/0057661 A1 * | 3/2003 | Thomas | B23B 31/1071 279/30 |
| 2004/0094909 A1 * | 5/2004 | Chiu | B25B 15/001 279/80 |
| 2005/0023777 A1 * | 2/2005 | Muller | B25B 23/0035 279/75 |
| 2005/0036844 A1 * | 2/2005 | Hirt | B25B 15/02 408/240 |
| 2007/0120331 A1 * | 5/2007 | Manschitz | B23B 31/107 279/19 |
| 2008/0197583 A1 * | 8/2008 | Furusawa | B25D 17/088 279/30 |
| 2010/0282485 A1 * | 11/2010 | Puzio | B23B 31/1074 173/217 |
| 2012/0326399 A1 * | 12/2012 | Lin | B23B 31/1071 279/75 |
| 2012/0326400 A1 * | 12/2012 | Lin | B23B 31/1071 279/75 |
| 2012/0326401 A1 * | 12/2012 | Puzio | B23B 31/1071 279/75 |
| 2013/0134684 A1 * | 5/2013 | Funk | B25B 23/0035 279/9.1 |

FOREIGN PATENT DOCUMENTS

| | | | | |
|---|---|---|---|---|
| DE | 20 2004 000 244 U1 | 4/2004 | | |
| DE | 10 2007 005 033 A1 | 8/2008 | | |
| GB | 2174934 A | * | 11/1986 | B25D 17/088 |
| GB | 2 401 817 A | 11/2004 | | |

OTHER PUBLICATIONS

German Search Report, dated Apr. 9, 2013, (three (3) pages).

* cited by examiner

HAND-HELD MACHINE TOOL

This application claims the priority of International Application No. PCT/EP2013/068704, filed Sep. 10, 2013, and German Patent Document No. 10 2012 216 137.6, filed Sep. 12, 2012, the disclosures of which are expressly incorporated by reference herein.

BACKGROUND AND SUMMARY OF THE INVENTION

The present invention relates to a handheld machine tool, in particular an electric screwdriver.

U.S. Pat. No. 5,398,946 A describes an electric screwdriver into whose tool mount can be inserted a screwdriver bit without operation of the tool mount. The screwdriver bit can be removed by shifting an actuating sleeve together with the tool in a common direction of removal.

The handheld machine tool according to the invention has an electric motor and an output spindle, which can be driven by the electric motor to rotate about a working axis. The output spindle has a cylindrical or prismatic intake space that is open on the output side and is oriented along a working axis to receive a tool in the direction opposite the removal direction and also has two elongated holes inserted into the intake space in the radial direction. A blocking element, which protrudes into the intake space, lies in the elongated hole and is movable between one end of the elongated hole on the output side and one end of the elongated hole on the drive side. The blocking element is forced into engagement in the intake space, in contact with a radial stop in the radial direction. In a locking position, the stop overlaps with the ends of the elongated holes on the output side and is displaceable in the removal direction opposite a spring force of a spring to release a radial movement of the blocking element out of engagement with the intake space. A spring has a support ring and two bows protruding away from the support ring in the withdrawal direction, curved in the form of a segment of a circle around the intake space, each of the bows having a pin that engages radially in the elongated hole in the withdrawal direction upstream from the blocking element.

The spring-action bows press the blocking elements into a locking position so that they are hindered from yielding radially out of the intake space. On insertion of a tool, the user can shift the blocking elements together with the bows toward the end of the elongated holes on the drive side. The blocking elements can yield radially here.

The spring with the bows, which are preferably designed with radial symmetry, is very compact. Furthermore, the symmetrical design, in particular mirror-symmetrical, design, prevents transverse forces, which can result in tilting of components with respect to the working axis and can lead to a potential skewing.

One embodiment is characterized in that the support ring is slotted and the two bows are each attached on one side of the slot. The bows may be inclined by a clearance angle with respect to the support ring, in particular in a relaxed state of the spring. The bows preferably only partially span the working axis, for example, by less than 180°, e.g., for approximately 90°.

One embodiment provides that the support ring, the bows and the pins are formed from a cohesive piece of wire.

One embodiment provides that a ramp is connected to the radial stop opposite the withdrawal direction. The ramp has a surface opposite the withdrawal direction and at a distance from the working axis. The blocking elements deflected when the tool is inserted experience a force in the withdrawal direction due to the spring, this force being deflected by the curtain formed by the ramp into a force acting partially toward the working axis. The blocking elements are thereby guided securely in engagement with the intake space and the tool situated therein.

BRIEF DESCRIPTION OF THE FIGURES

The following description illustrates the invention on the basis of the exemplary embodiments and figures. In the figures.

DETAILED DESCRIPTION OF THE FIGURES

Figure 1:
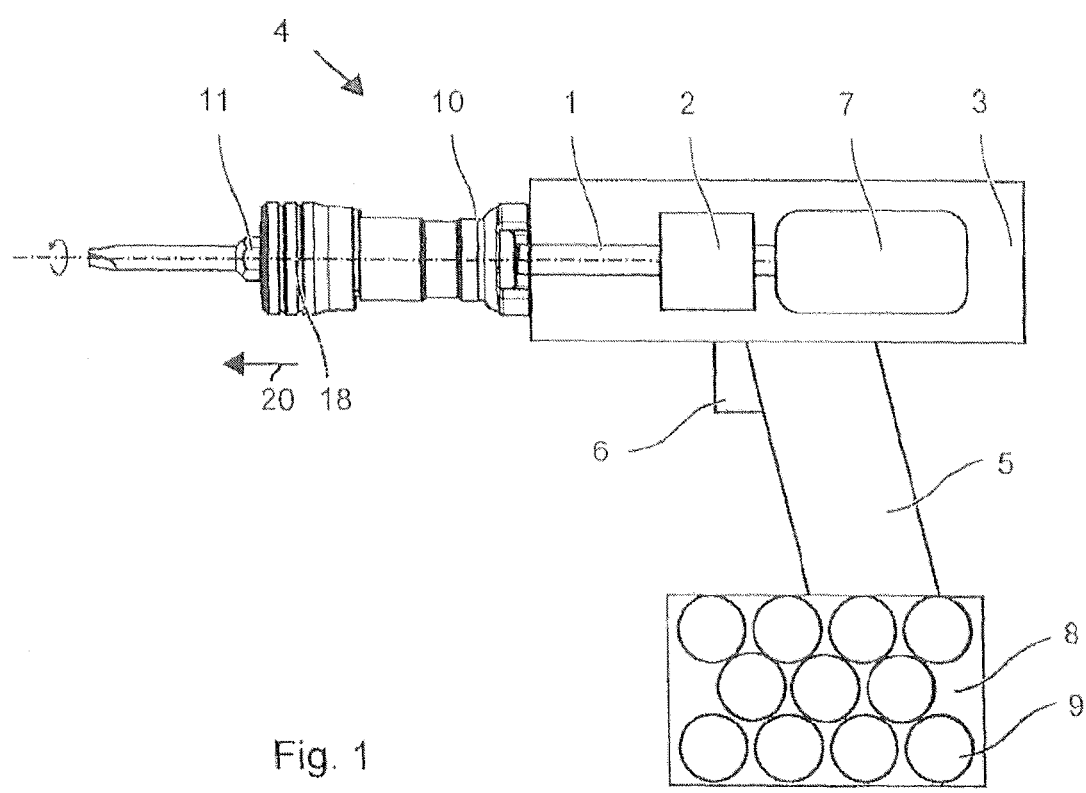
FIG. 1 shows an electric screwdriver.
Figure 2:
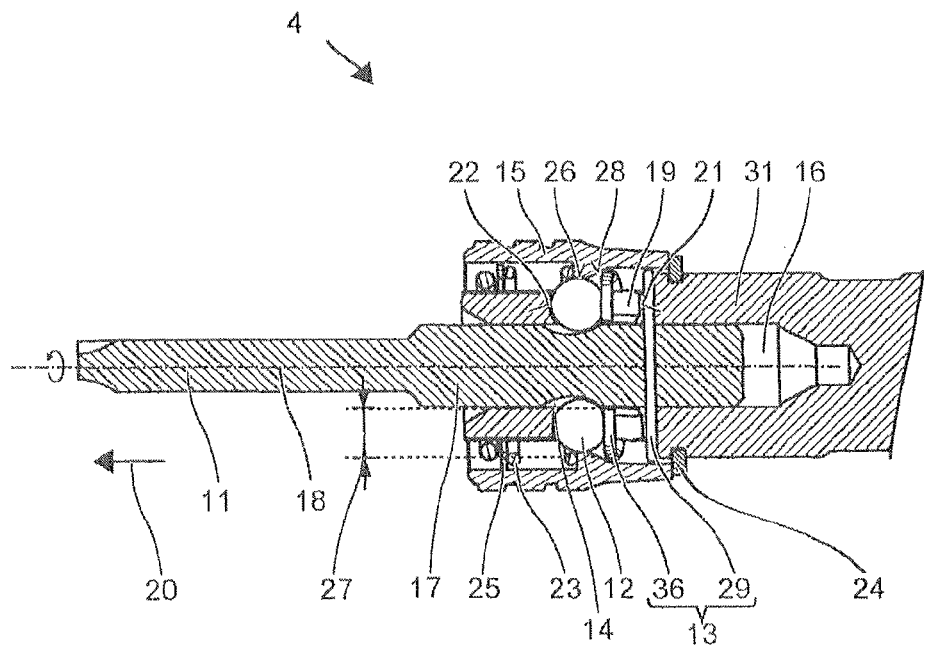
FIG. 2 shows a tool mount of the electric screwdriver.
Figure 3:
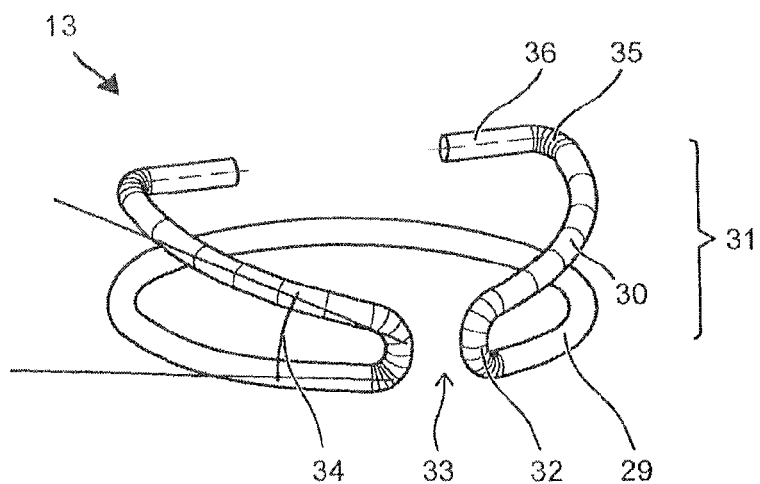
FIG. 3 shows a spring of the tool mount.

The same elements or those having the same function are indicated by the same reference numerals in the figures unless otherwise indicated.

FIG. 1 shows schematically an electric screwdriver 4. The electric screwdriver 4 has a tool mount 10 for holding a tool 11 having a prismatic shaft, for example, a screwdriver bit. An electric motor 7 is connected by a drive train to the tool mount 10 to drive it to rotate about a working axis 18 during operation. The tool mount 10 is rigidly and preferably permanently connected to an output spindle 1. The drive train may include a gear 2, a torque clutch, for example, an adjustable torque clutch. A housing 3 of the electric screwdriver 4 is provided with a handle 5 for guiding the electric screwdriver 4 and a system sensor 6 for starting operation of the electric screwdriver 4 by the user. The electric motor 7 has a power supply by means of a removable battery pack 8 having a plurality of secondary battery cells 9, for example.

The tool mount 10 is designed for independent locking of the tool 11. The blocking elements 12 may yield on insertion of the tool 11. Then the blocking elements 12 engage in a ring groove 14 of the tool 11, driven by a spring 13. The blocking elements 12 prevent the tool 11 from being extracted or falling out. A user can cancel the lock by the locking element 12 and remove the tool 11 by shifting an actuation sleeve 15.

The tool mount 10 has prismatic intake space 16 with a cavity, for example, that is usually hexagonal. The intake space 16 is designed to be complementary to the tools that are provided for example with a hexagonal shaft end 17, for example, a screwdriver bit. The intake space 16 is designed to be coaxial with the working axis 18 in the output spindle 1. Two diametrically opposed elongated holes 19 in the output spindle 1 open the intake space 16 in the radial direction. The elongated holes 19 are oriented with their large dimension parallel to the working axis 18. A length (dimension along the working axis 18) of an elongated hole 19 is between 50% and 150% larger than a width (dimension in the circumferential direction around the working axis 18) of the elongated hole 19. The elongated holes 19 are closed in the withdrawal direction 20 of the tool 11. A ball 12, which forms an exemplary blocking element, lies in each of the elongated holes 19. The balls 12 may protrude partially into the intake space 16. The depth of penetration into the intake space 16 is limited by the profile of the elongated hole 19. The blocking element can be moved in the elongated hole 19 along the working axis 18 with the movement in the withdrawal direction 20 being limited by an end face 22 on the output side and the movement opposite the withdrawal direction 20 being limited by an end face 21 of the elongated hole 19 on the drive side.

The actuation sleeve 15 encloses the intake space 16 at the height of the elongated holes 19. The actuation sleeve 15 is pressed against a stop 24 by helical spring 23 opposite the withdrawal direction 20. This position is the basic position. The helical spring 23 is clamped on the output spindle 1 with prestress between the actuation sleeve 15 and a rupture spring 25, for example. The stop 24 is a spring ring, for example. The user can shift the actuation sleeve 15 in the withdrawal direction 20 parallel to the working axis 18 and against the force of the helical spring 23.

The actuation sleeve 15 is provided with a contour on its inside surface that is preferably rotationally symmetrical. The contour has a surface 26 parallel to the working axis 18, this surface being the smallest distance away from the working axis 18. The surface 26 serves to block a radial movement of the ball 12 and is therefore referred to hereinafter as the blocking surface 26. The radial distance 27 of the blocking surface 26 is of such a dimension that when the ball 12 comes in contact with the blocking surface 26, a portion of the ball 12 protrudes into the intake space 16. The radial distance 27 of the blocking surface 26 from the intake space 16 is smaller than the radial dimension of the blocking element 12. The blocking surface 26 is in contact with the ball 12 tangentially when the actuation sleeve 15 is in the basic position and the ball 12 is in contact with the end face 22 on the output side. A ramp 28 inclined toward the working axis 18 is connected to the blocking surface 26 opposite the withdrawal direction 20. The ramp 28 increases its distance from the working axis 18 opposite the withdrawal direction 20. At the end of the ramp 28, the radial distance is at least so great that the ball 12 can emerge completely from the intake space 16 in the radial direction.

A spring 13 presses the two balls 12 in the withdrawal direction 20. The balls 12 are held in the basic position by the spring 13 and are in contact with the end face 22 of the elongated hole 19 on the output side. The spring 13 has a support ring 29 which is in contact with the output spindle 1. Two bows 30 stand away from the support ring 29 in the withdrawal direction 20. The two bows are preferably designed to be the same as one another or in mirror symmetry with one another. The bow 30 has a curved section 31 running around the working axis 18 in the form of segment of a circle. The bow 30 spans approximately 90°, for example. The radius of the section 31 is preferably equal to the radius of the support ring 29. A base end 32 of the bow 30 is connected to the support ring 29 in a materially bonded manner. The base ends 32 of the two bows 30 may be arranged opposite one another on a slot 33 in the support ring 29. The spring 13 made of the wire is bent, for example. The bow 30 develops seamlessly into the support ring 29. In the region of the base end 32, the wire is bent by somewhat less than 180° about an axis, which is perpendicular to the working axis 18. The bow 30 is tilted by a clearance angle 34 with respect to the support ring 29. The clearance angle 34 is in the range of 10° to 25°. A pin 36 is connected to one head end 35 of the bow 30. The two pins 36 are diametrically opposite one another, based on the working axis 18. The pin 36 is preferably perpendicular to the working axis 18. Alternatively, the pin 36 may be inclined by an angle of up to 10° with respect to the working axis 18 opposite the withdrawal direction 20. The pin 36 runs from the head end 35 to the working axis 18 opposite the withdrawal direction 20. A radial dimension of the pin 36 is of such a size that the pin 36 overlaps with at least half of the ball 12 along the radial direction. The pin 36 engages in the elongated hole 19 in the withdrawal direction 20 in front of the ball 12. The pin 36 preferably presses the ball 12 with its prestress against the rear end face 22.

The invention claimed is:

1. A handheld machine tool, comprising:
an electric motor;
an output spindle which is drivable by the electric motor to rotate about a working axis and which has a cylindrical or prismatic intake space, wherein the intake space is oriented along the working axis and is open at an output side for receiving a tool opposite a withdrawal direction and has two elongated holes in a radial direction;
two blocking elements, wherein the two blocking elements each are protrudable into the intake space and respectively lie in one of the two elongated holes and are movable between a first end of the elongated hole on the output side and a second end of the elongated hole on a drive side;
a radial stop, against which, in the radial direction, the two blocking elements are protrudable into the intake space at the first end of the elongated holes;
wherein the two blocking elements are displaceable out of protruding into the intake space by moving the radial stop in the withdrawal direction against a spring force of a first spring; and
a second spring which has a support ring and two bows which protrude away from the support ring in the withdrawal direction and which are curved in a form of a segment of a circle around the intake space, wherein a respective strap of each of the two bows has a pin which engages radially in a respective one of the two elongated holes in front of a respective blocking element in the withdrawal direction.

2. The handheld machine tool according to claim 1, wherein the two bows are arranged in mirror symmetry to one another.

3. The handheld machine tool according to claim 1, wherein the support ring has a slot and wherein the two bows are each attached on a respective side of the slot.

4. The handheld machine tool according to claim 1, wherein the two bows are inclined by a clearance with respect to the support ring.

5. The handheld machine tool according to claim 1, wherein the two bows span the working axis by less than 180°.

6. The handheld machine tool according to claim 1, wherein the support ring, the two bows, and the pins are formed from one cohesive piece of wire.

7. The handheld machine tool according to claim 1, wherein a ramp is connected to the radial stop opposite the withdrawal direction.

* * * * *